United States Patent
Bowman

(10) Patent No.: US 8,015,306 B2
(45) Date of Patent: Sep. 6, 2011

(54) METHOD AND APPARATUS FOR SYNCHRONIZING PLAYBACK OF STREAMING MEDIA IN MULTIPLE OUTPUT DEVICES

(75) Inventor: Timothy D. Bowman, Salt Lake City, UT (US)

(73) Assignee: Control4 Corporation, Draper, UT (US)

( * ) Notice: Subject to any disclaimer, the term of this patent is extended or adjusted under 35 U.S.C. 154(b) by 1061 days.

(21) Appl. No.: 11/031,671

(22) Filed: Jan. 5, 2005

(65) Prior Publication Data

US 2006/0149850 A1 Jul. 6, 2006

(51) Int. Cl.
*G06F 15/16* (2006.01)
*H04L 12/26* (2006.01)

(52) U.S. Cl. ........ 709/231; 709/203; 709/205; 709/230; 709/232; 370/229; 370/230; 370/231

(58) Field of Classification Search .................. 709/203, 709/205, 230, 231, 232; 370/229–231
See application file for complete search history.

(56) References Cited

U.S. PATENT DOCUMENTS

| | | | | |
|---|---|---|---|---|
| 4,991,032 A * | 2/1991 | Staffer | ............................. | 386/66 |
| 5,333,299 A * | 7/1994 | Koval et al. | .................... | 713/400 |
| 5,339,413 A * | 8/1994 | Koval et al. | .................... | 719/314 |
| 5,553,222 A * | 9/1996 | Milne et al. | .................... | 715/201 |
| 5,568,614 A * | 10/1996 | Mendelson et al. | .......... | 709/231 |
| 5,623,483 A * | 4/1997 | Agrawal et al. | ............... | 370/253 |
| 5,661,665 A * | 8/1997 | Glass et al. | ................. | 348/423.1 |
| 5,832,309 A * | 11/1998 | Noe et al. | ......................... | 710/61 |
| 5,928,330 A * | 7/1999 | Goetz et al. | .................... | 709/231 |
| 6,490,053 B1 * | 12/2002 | Takahashi et al. | ........... | 358/1.18 |
| 6,490,553 B2 * | 12/2002 | Van Thong et al. | ........... | 704/211 |
| 6,526,325 B1 * | 2/2003 | Sussman et al. | ................ | 700/94 |
| 6,665,751 B1 * | 12/2003 | Chen et al. | ........................ | 710/52 |
| 7,047,308 B2 * | 5/2006 | Deshpande | .................... | 709/232 |
| 7,088,774 B1 * | 8/2006 | Moni et al. | ............... | 375/240.16 |
| 7,464,172 B2 * | 12/2008 | Deshpande | .................... | 709/232 |
| 2003/0005139 A1 * | 1/2003 | Colville et al. | ............... | 709/231 |
| 2003/0236906 A1 * | 12/2003 | Klemets et al. | ............... | 709/231 |
| 2004/0068588 A1 * | 4/2004 | Kowalski et al. | ............ | 709/248 |
| 2004/0156624 A1 * | 8/2004 | Kent et al. | ..................... | 386/125 |
| 2004/0252400 A1 * | 12/2004 | Blank et al. | ...................... | 360/70 |
| 2005/0235534 A1 * | 10/2005 | Luinstra | ......................... | 40/454 |
| 2006/0002681 A1 * | 1/2006 | Spilo et al. | ....................... | 386/46 |
| 2006/0007960 A1 * | 1/2006 | Liu et al. | ........................ | 370/503 |
| 2006/0117357 A1 * | 6/2006 | Surline | ............................ | 725/90 |
| 2007/0038999 A1 * | 2/2007 | Millington | .................... | 718/100 |

* cited by examiner

*Primary Examiner* — Emmanuel L Moise
*Assistant Examiner* — Farzana Huq
(74) *Attorney, Agent, or Firm* — The Hecker Law Group, PLC

(57) ABSTRACT

A method and apparatus for synchronizing streaming media with multiple output devices. One or more media servers serve media streams to one or more output devices (i.e., players). For playback synchronization, one output device is the "master", whereas the remaining output devices are "slaves". More data is requested from the media server by the "master" device to maintain a nominal buffer fill level over time. The "slave" devices receive streamed data from the media server at the rate determined by the master device's data requests, and the average rate of data flow over the streaming network is thus controlled by the frequency of the single "master" device's crystal. "Slave" devices make playback rate corrections to maintain respective buffer fill levels within upper and lower threshold levels. For slow networks, each media data packet timestamp is calculated from the time the master's buffer reaches nominal level.

9 Claims, 8 Drawing Sheets

METHOD AND APPARATUS FOR SYNCHRONIZING PLAYBACK OF STREAMING MEDIA IN MULTIPLE OUTPUT DEVICES

FIELD OF THE INVENTION

The invention relates generally to the field of streaming media, and more specifically, to the synchronization of media playback over multiple output devices.

A portion of the disclosure of this patent document contains material which is subject to copyright protection. The copyright owner has no objection to the facsimile reproduction by anyone of the patent document or the patent disclosure, as it appears in the Patent and Trademark Office file or records, but otherwise reserves all copyrights associated with this document.

BACKGROUND

In the past, media systems have been composed of a single player device, such as a stereo system, with multiple speakers attached by long analog lines. In such prior art systems, the possible configurations are limited by the use of a single player system and the number of speakers or other presentation devices that the single player can drive. Also, because the presentation is defined by the hardwired speaker configuration, it is difficult to alter the physical configuration without extensive rewiring.

As a solution to the constraints imposed by prior art single-player systems, the present invention employs a digital streaming paradigm with multiple players, referred to herein as output devices. The primary source for streaming media is referred to as the media server. By supporting multiple players or output devices, streaming media systems provide the ability to support greater numbers of speakers, displays or other presentation devices, as well as much improved configurability. Such streaming media systems are particularly useful for delivering media playback to multiple rooms, listening areas separated by distance or otherwise spatially distinct media delivery points.

However, by implementing multiple playback devices, time-related distortion may be experienced where two listening or viewing areas overlap. This time-related distortion may result from lack of playback synchronization between output devices.

The rate at which each player device processes media data (e.g., by converting digital samples to analog signals for speakers, etc.) is determined by the frequency of the player device's internal crystal that is used to provide the primary clock source. Yet, crystal oscillator frequencies may vary from crystal to crystal, and are also affected by crystal age and temperature. Therefore, the frequencies for two crystal oscillators (and thus the playback rates for two media player devices) may differ by an initial frequency error that may also vary over time as the crystal ages or the playback environment changes. The scenario described below will help illustrate how such synchronization errors arise, and what problems are associated with such errors.

As an example of a streaming system, consider the following family residence scenario. Assume that a first output device is a portable wireless device carried by Daughter, who happens to be relaxing in the living room while listening through headphones to her favorite CD streamed from a first media server. At the same time, Son A and Son B are watching the newest DVD movie streamed from a second media server to a second output device in the family room, which feeds the DVD video to a big screen television and analog audio to surround sound speakers.

While Son A, Son B and Daughter are warm inside, Father is outside on the back porch barbecuing in near-freezing weather. The back porch is wired with an older third output device, which drives the outdoor speakers. Initially, Father is listening to the streaming audio from the first media server, but finds that Daughter's choice in music is not to his taste. Father then switches to the DVD media stream in progress so that he can watch the big screen television through the window, while listening to the analog audio played back over the outdoor speakers.

Without synchronization of the media stream playback, the audio that Father is listening to on the porch may begin to diverge from the DVD playback occurring on the independent output device in the family room. This may occur, for example, because the crystal inside the output device on the back porch is older and colder than the crystal inside the output device in the family room, which is stored in a cabinet already heated well-above room temperature by other similarly-stored electronic equipment. Also, because Father joined a media stream already in progress, the start-up latency of the outdoor output device may cause a playback timing offset relative to the output device in the family room.

For Son A, who is sitting near the porch window, the time discrepancy between the audio played in the family room and the muffled audio coming through the window from the porch speakers may diminish his enjoyment of the DVD movie, as the porch audio interferes with the surround sound audio inside. If the time divergence is sufficiently large, Father may also notice with dismay that the sound track playback on the porch is out of sync with the events occurring on the big screen television inside. These types of problems may be more apparent for longer playing media streams.

In view of the foregoing problems with streaming systems, the present inventor has determined that it would be desirable to have a streaming media system in which the playback processes of the various output devices are synchronized.

SUMMARY OF THE INVENTION

The invention provides a method and apparatus for synchronizing streaming media with multiple output devices. Embodiments of the invention allow a digital media data source, such as an MP3, WAV or digital video file, to be played on multiple, physically distinct player devices, while maintaining average timing synchronization of playback output.

In one or more embodiments of the invention, one or more media servers serve media streams to one or more output devices (i.e., player devices). For synchronization, one output device is designated as the "master", whereas the remaining output devices are designated as "slaves". In the "master" device, incoming digital media data is added to a memory buffer, and the buffer is emptied at a rate determined by the playback process implemented by a media renderer or DAC of that output device, which is in turn dependent upon the frequency of its crystal oscillator. As the buffer is emptied, more data is requested from the media server by the "master" output device to maintain a nominal buffer fill level over time. The "slave" output devices receive streamed data from the media server at the rate determined by the master device's data requests, and the average rate of data flow over the streaming network is thus controlled by the frequency of the single "master" device's crystal.

In one or more embodiments, the "slave" devices buffer the received media data and monitor the buffer fill level. When the buffer fill level of a "slave" device rises too high or falls too low, the slave device implements a playback rate correction. Thus, all output player devices play the streamed data at the same average rate, and the media presentation remains synchronized between output devices over time.

In one embodiment, an output device implements playback rate corrections by adjusting the control voltage of a voltage-controlled oscillator (VCXO). In another embodiment, an output device implements playback rate corrections by adding or subtracting data samples to raise or lower the buffer fill level.

DETAILED DESCRIPTION

The present invention provides a method and apparatus for synchronizing the playback of streaming media among multiple, spatially distinct output devices. In the following description, numerous specific details are set forth to provide a more thorough description of the invention. It will be apparent, however, to one skilled in the art, that the invention may be practiced without these specific details. In other instances, well known features have not been described in detail so as not to obscure the invention.

I. Example Streaming Media System

Figure 1:
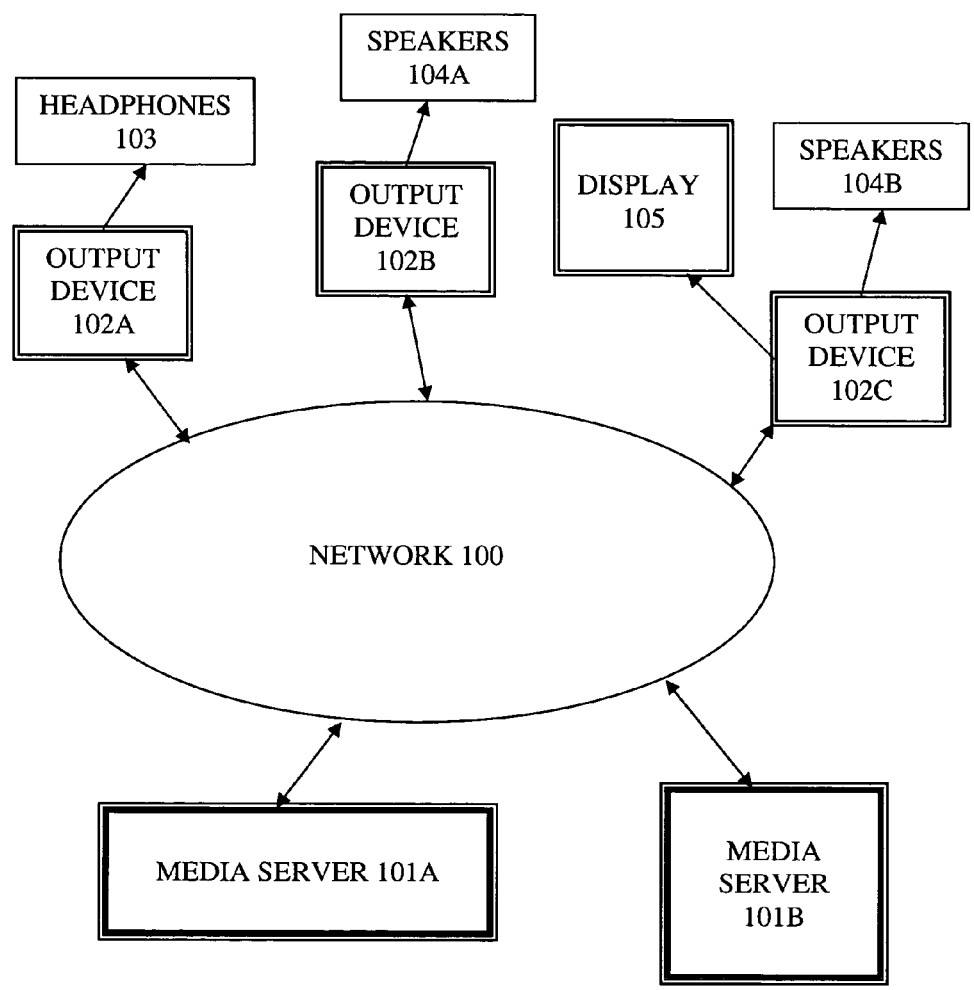
FIG. 1 is a block diagram of a sample media network environment, in accordance with one or more embodiments of the invention

FIG. 1 is a block diagram of a media network environment including multiple media servers and multiple output devices (i.e., players; also referred to as "clients" of the media server). Such a network environment may be implemented, for example, within a residence, an office, a department store, or any other venue where it may be desirable to have the same media played in multiple locations (e.g., different rooms of a residence).

The streaming media data typically includes digital audio data and or digital video data for playback over conventional speakers and video displays. However, embodiments of the invention may also be used in more creative applications, such as amusement rides, live shows involving synchronized special effects spread over a large theatre or outdoor display, etc. For such creative applications, the streaming "media" data may consist of, or include a channel or channels for digital control information, such as control information for triggering special light displays, water fountain timing, atmospheric effects, animatronics, or other effects that would benefit from the synchronizing aspect of embodiments of the invention.

As shown in FIG. 1, media servers 101A and 101B are coupled to network 100 to serve digital media data (and/or other streaming digital data as mentioned below). Though shown with two media servers, embodiments of the invention may support networks including a single media server or any number of multiple media servers. The network may be a wired network, such as an Ethernet network using coaxial cable, twisted pair, fiber optic cable, or any other existing or future wire configuration suitable for delivering data packets for data streaming applications. The network may also be wireless, using infrared, cellular, WiFi, Bluetooth, or other current or future wireless transmission schemes, both public and proprietary. Network 100 may also be a hybrid network, including wired and wireless elements, with bridging devices providing the crossover mechanism between the wired portions of the network and the wireless portions.

Also coupled to network 100 are multiple output devices (e.g., devices 102A-102C) configured to receive the streaming digital data and render or convert the digital data into suitable drive signals for speakers, headphones, displays, etc. In the example shown, output device 102A drives headphones 103, output device 102B drives one or more speakers 104A and output device 102C drives a display 105 and one or more speakers 104B.

As an example implementation of the network of FIG. 1, assume that output device 102A is a portable wireless device carried by Daughter, who happens to be relaxing in the living room while listening through headphones 103 to her favorite CD streamed from media server 101A. At the same time, Son A and Son B are watching the newest DVD movie streamed from media server 101B (or 101A) to output device 102C in the family room, which feeds the DVD video to big screen television 105 and analog audio to surround sound speakers 104B.

While Son A, Son B and Daughter are warm inside, Father is outside on the back porch barbecuing the weekend meal in near-freezing weather. The back porch is wired with an older output device 102B, which drives outdoor speakers 104A. Initially, Father is listening to the streaming audio from media server 101A, but finds that Daughter's choice in music is not to his taste. Father then switches to the DVD media stream in progress so that he can watch the big screen television 105 through the window while listening to the DVD audio over the porch speakers.

Without synchronization of the media stream playback, the audio that Father is listening to on the porch may begin to diverge from the DVD playback occurring on output device 102C in the family room. This may occur because the crystal inside output device 102B on the back porch is older and colder than the crystal inside output device 102C, which is stored in a cabinet already heated well-above room temperature by other similarly-stored electronic equipment. Also, because Father joined a media stream already in progress, the start-up latency of output device 102B, if left uncompensated, may cause a playback offset relative to output device 102C.

For Son A, who is sitting near the porch window, the time discrepancy between the audio played in the family room and the muffled audio coming through the window from the porch speakers may diminish his enjoyment of the DVD movie as the porch audio interferes with the surround sound audio. If the time divergence is sufficiently large, Father may notice that the sound track playback on the porch is out of sync with the events occurring on the big screen television inside.

Using the synchronization method of the present invention, the average playback rate over time of output device 102B (e.g., on the back porch) will match that of output device 102C (e.g., in the family room). Thus, despite differences in temperature and crystal age, output devices 102B and 102C will provide a substantially synchronous playback experience.

II. Embodiment of Synchronized Streaming Process

Figure 2:
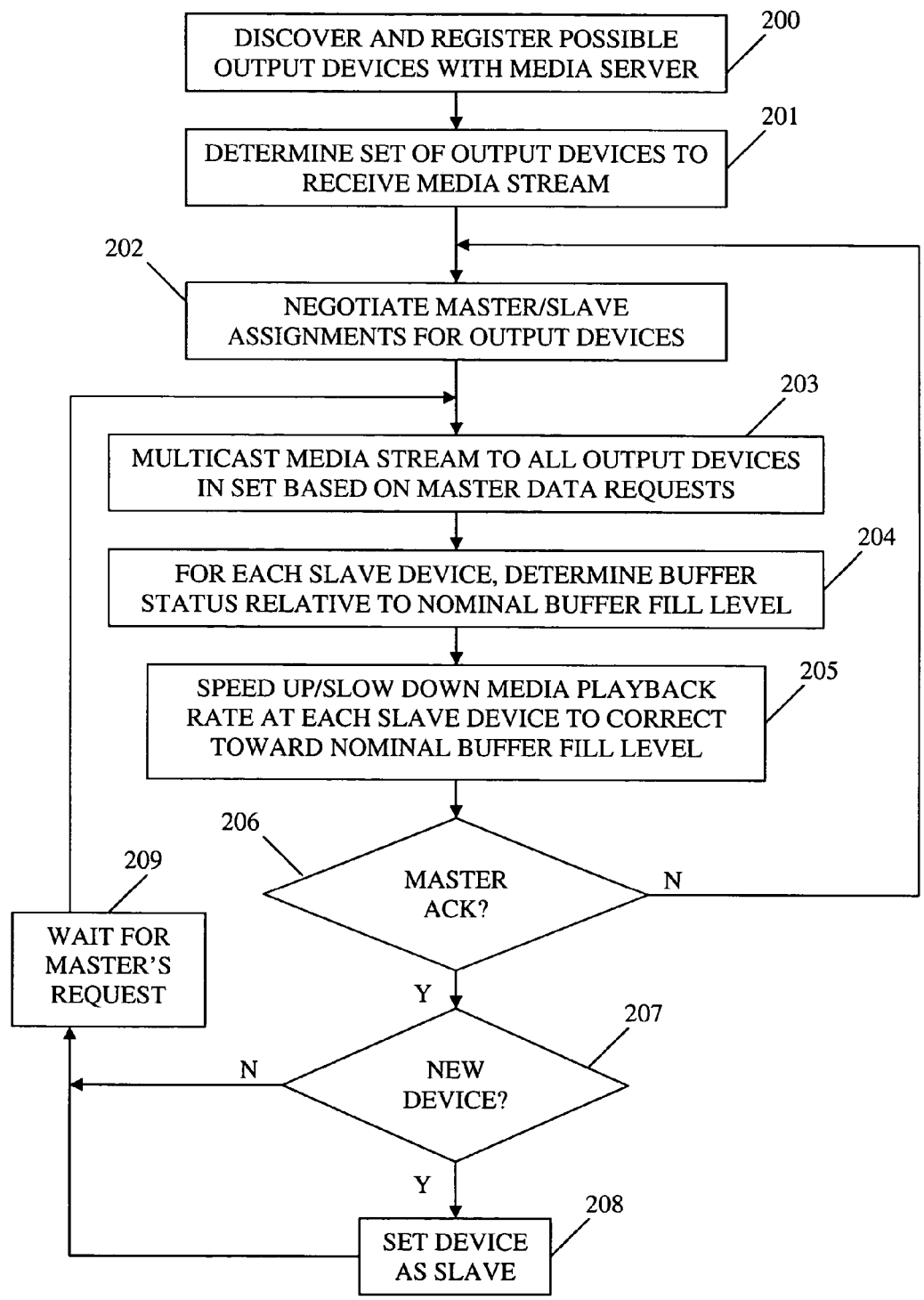
FIG. 2 is a flow diagram of a general media streaming process with synchronized playback in accordance with one or more embodiments of the invention.

FIG. 2 is a flow diagram of a process for streaming media to multiple output devices for synchronized playback, in accordance with one or more embodiments of the invention. As a preliminary step, in block 200, the media server discovers available output devices on its network, that is, those output devices attached to a corresponding wired network or those devices that are within transmission range in a corresponding wireless network. Any discovery protocol may be used in one or more embodiments of the present invention. As an example, in one embodiment, the media server broadcasts a message requesting that all output devices announce their presence. Available output devices may then respond to the media server with messages including an output device identifier (e.g., a UUID or a MAC address). The media server then records the output device's device identifier in a local registry.

The media server may repeat device discovery at intervals to identify when registered devices are no longer active or when a new output device has become active (e.g., by being turned on or by moving within range). Output devices may also broadcast presence announcements on their own to attach themselves to available media servers.

In setting up a media stream, in block 201, the media server determines which output devices in its registry are to receive the stream. For example, a user may select a set of output devices via a user interface on the media server itself, or remotely, such as via a media server web page. In one or more embodiments, the output devices themselves may be configured with a mechanism for selecting and initiating a media stream, or associating themselves with one or more pre-existing media streams.

For example, the local registry of output devices may have an additional column in which a stream ID may be stored for each output device. Likewise, for each media stream, the media server may include a list of output device IDs associated with the respective media stream. Embodiments of the invention may use any mechanism for maintaining associations between media streams and output devices.

In block 202, the media server and output devices negotiate to determine the master device, i.e., that output device to which all other output devices will synchronize playback rates. Typically, there will be one master device with the rest of the devices set as slaves. If the media server supports multiple concurrent media streams, each active media stream may have its own associated master device.

In block 203, the media server begins streaming the selected media to the output devices as a sequence of packets (e.g., using the RTP real-time transmission protocol or a variant thereof). The packets are transmitted (e.g., multicast or unicast in round-robin order or an order optimized based on routing distance) to the set of output devices selected to receive the stream. Subsequent packets are transmitted when more media data is requested by the output device designated as the master.

At each output device, the data packets are written to a data buffer prior to playback. Each packet typically includes a sequence number, which the output devices may use to re-sequence packet data in the buffer in the event that packets are received out of sequence. Also, in the event that a packet is missed, an output device (master or slave) may request that a packet with the missing sequence number be resent. In some embodiments, the output devices may maintain space in the buffer for missing and out of sequence packets, for later insertion of the packet data when finally received.

In each output device, media data is read from the buffer by the playback process at a playback rate synchronized to the primary clock source of the respective device (typically, a crystal oscillator). The playback rate may be specified in general terms such as samples per second. However, the actual playback rate at any one output device is subject to the small variations in clock frequency specific to that output device by virtue of, for example, the relative temperature and age of the crystal oscillator.

In block 204, each slave device monitors its own buffer status relative to a nominal buffer fill level. If the buffer fill level is too high (i.e., the playback process is not reading data from the buffer fast enough) or too low (i.e., the playback process is reading data from the buffer too fast), the slave device identifies that a playback rate correction is appropriate. In one embodiment, upper and lower threshold fill levels may be used to determine when the buffer fill level has exceeded or fallen below the nominal level by a specified amount. These levels may be adjusted dynamically according to "jitter" in packet arrival time, due to variations between output devices with respect to network latency.

In block 205, any needed playback rate correction is executed in the respective slave device to either speed up or slow down playback. As a result, the respective buffer fill level is adjusted in the direction of the nominal fill level.

In step 206, if the master output device acknowledges the transmission of the current packet or set of packets (e.g., sends an acknowledgement message to the media server), the process continues to block 207. However, if the master output device fails to acknowledge the current packet or set of packets (multiple attempts may be made), the media server may initiate a negotiation for a new master output device at block 202, or the media server may request an acknowledgment (ACK) retry from the master, after a pre-determined timeout.

If a new device is detected (e.g., a user wishes to join an existing media streaming session) at block 207, then the new device is set as a slave in block 208, and its buffer is written to the nominal fill level with null/blank data (e.g., audio silence and/or black video). New packets will be appended to the buffer after the null data.

In step 209, the media server waits for a message from the master output device, requesting more data. The master output device monitors its buffer as data is consumed by the playback process, and when the buffered data falls below a preset threshold level (e.g., two seconds worth of buffered data), the master output device sends a message to the media server requesting more data. In response to the request, the media server transmits the next packet or set of packets in the media stream at block 203.

III. Embodiment of Media Server

Figure 3A:
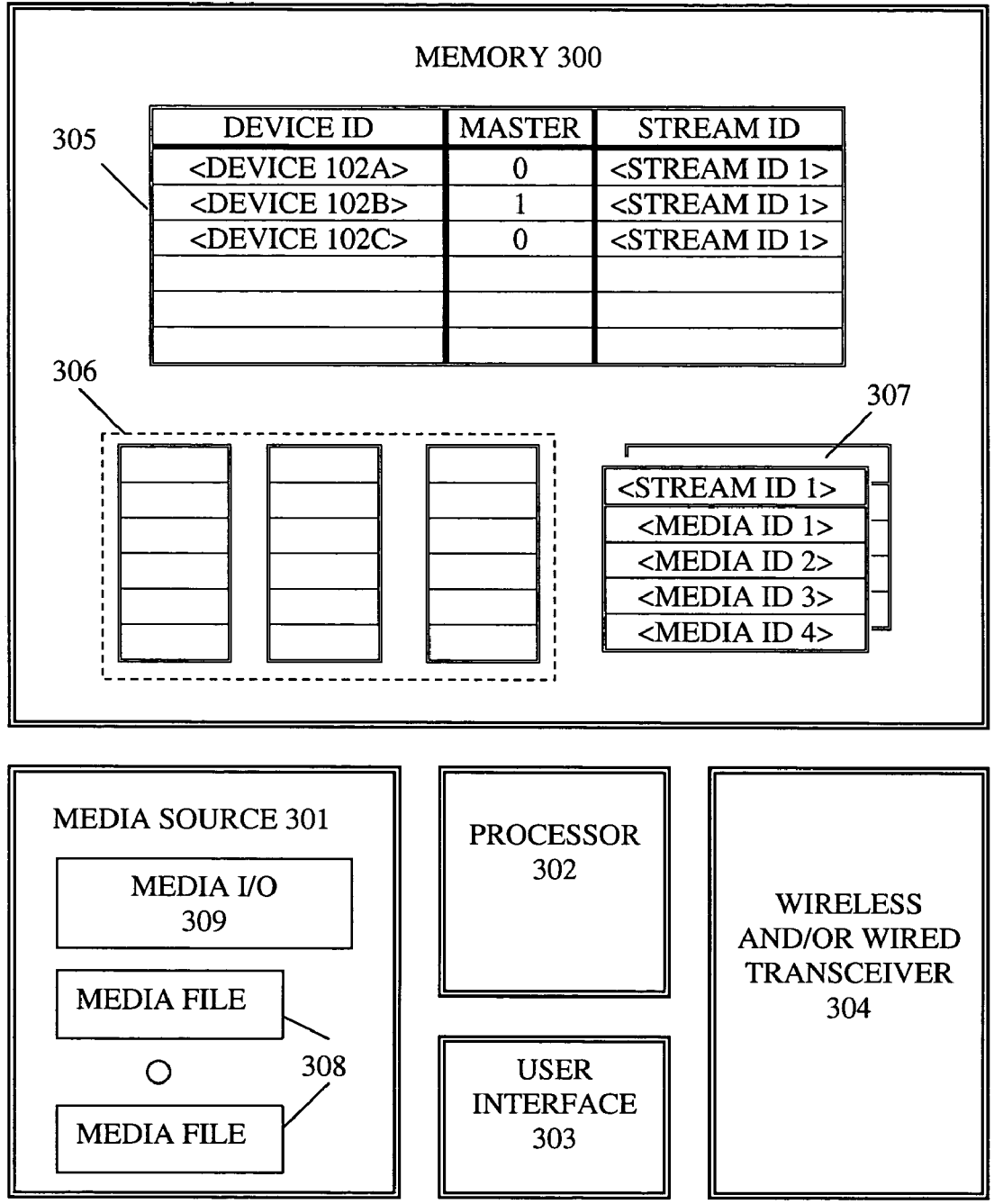
FIG. 3A is a block diagram of a media server device in accordance with one or more embodiments of the invention.

FIG. 3A is a block diagram of a media server in accordance with one or more embodiments of the invention. The media server of FIG. 3A includes memory 300, media source 301, processor 302, user interface 303 and wireless and/or wired transceiver 304.

Memory 300 may include volatile and non-volatile memory, random access (RAM) and read-only memory (ROM). Memory 300 stores the associations used by the media server to track output devices, master device designations, media streams, media files, and the relationships between them. In the example illustrated in FIG. 3A, memory 300 includes one or more data structures 305 associating the device identifiers of output devices with one or more active media streams.

In one or more embodiments, data structure 305 may incorporate the local registry of discovered output devices, though other embodiments may implement the registry separately. Following on the example of FIG. 1, data structure 305 includes the device identifiers for devices 102A-102C. The associated stream identifiers refer to a single stream identified by "stream ID 1", though the use of stream identifiers facilitates the implementation of multiple, concurrent streams. In some embodiments, where the media server supports only one active stream at any time, the stream identifier may be omitted. A stream flag may be implemented in place of the stream identifier to indicate those output devices that are selected to receive packet transmissions for the current active stream.

A "master" flag bit may be associated with each device entry to indicate which device is the master output device. In FIG. 3A, device 102B is shown with its master flag bit set. Devices 102A and 102C, in contrast, are designated as slave devices.

Data structures 306 represent stream buffers with, for example, one buffer associated with each active stream. The stream buffer may be used for the organization and temporary storage of RTP packets (or the data associated therewith) for subsequent transmission as data requests are received from the designated master output device. Media data for filling buffers 306 is obtained from media source 301.

In one or more embodiments, the media server may also act as an output device (in which case the media server may act as the master for playback synchronization purposes). With the media server acting as an output device, one of buffers 306 may act as a "receive" buffer for playback processing.

In one embodiment, one or more playlist data structures 307 may reside in memory 300. Playlist 307 may be used for the storage of a user's play selections for a media stream. For example, a user may select a playlist including multiple media files 308 from media source 301. If there is only one active media stream, the playlist structure may include an ordered list of media identifiers (shown as media ID 1, media ID 2, media ID 3 and media ID 4), which may be in the form of, for example, numerical identifiers, song or file names, and/or source identifiers (e.g., "DVD player", "cable tv", etc.). Where multiple streams or playlist preferences are implemented, the playlist structures 307 may each include a stream identifier as well.

The data structures shown in memory 300 of FIG. 3A are for purposes of illustration only. It will be understood that other data structures may also be used to provide the device and stream associations for embodiments of the invention. The represented data structures may be used to implement and/or enhance embodiments of the invention. In addition to what is shown, other media server data may also be stored in memory 300, such as media server settings, user preferences and statistics (such as network information about output devices), as well as media server software code executed by processor 302 to implement media server-specific aspects of the invention and general media server functions.

In the embodiment of FIG. 3A, media source 301 may include a media input/output block 309 and/or storage for one or more media files 308. Media I/O 309 may include ports for receiving media from an external source, such as a digital or analog video and/or audio recording device (e.g., a camera, a microphone, etc.), another media transmission system (e.g., a television cable box or tuner, satellite dish, DSL modem, radio tuner, other network connection, streaming web site (e.g., internet radio), etc.), and/or other playback devices (such as DVD or CD players, video cassette recorders, record players, personal computers, portable media players, etc.).

The media server itself may include an internal DVD, CD or tape drive (or the like), or mass storage (e.g., hard disk drive, flash drive, etc.) for recorded or downloaded media data. The individual media files from such internal sources are represented as media files 308 in FIG. 3A.

Processor 302 may be any type of microprocessor or combination of processors, and may include specialized processing circuits such as digital signal processors (DSPs) and graphics processing units (GPUs). In one or more embodiments, processor 302 executes software or firmware instructions to serve media data to selected output devices, including implementing the methods described in this specification.

Though not shown specifically in FIG. 3A, the media server may include software and/or hardware for converting media of one data type into another data type more conducive to streaming to output devices or more likely to be supported by the playback processing hardware or software of the selected output devices. Such conversion may include, for example, conversion between different digital formats (e.g., WAV to MP3), separation of audio and video channels from composite data, conversion of audio data into surround sound or other spatial audio representations, resampling of data, filtering or equalizing of data, and/or analog to digital conversion.

User interface 303 provides the mechanism by which a user interacts with the media server to perform such functions as: selecting media files or sources to associate with a media stream; selecting output devices to receive the streams; scheduling, initiating or resetting media streams; and setting server preferences and security settings. Though user interfaces will differ among embodiments of the invention, most user interfaces will include some form of display for visual feedback to the user and some form of mechanical input device by which the user may input selections, or the interface may be operated by or in cooperation with other software through a network connection.

For example, the media server may include multiple pushbuttons and an LCD display by which the user can input and view his or her selections. The media server may also or alternatively be equipped with a remote control and/or voice command system. A local television monitor may serve to display the user's options and selections. Also, the media server may be configured to communicate with a personal computer to present a configuration interface to a user (e.g., via proprietary interface software or general interface mechanisms such as web pages).

Wireless and/or wired transceiver 304 provides the network interface for the media server to communicate with the available output devices. In one or more embodiments, information to be transmitted to output devices is transferred to transceiver 304 by processor 302. Transceiver 304 implements the communication protocol of the media network (e.g., Ethernet IP protocol, 802.11b/g wireless protocol, etc.) to transmit the information (e.g., in packet form) to the chosen output device(s). Similarly, when communications are received from output devices on the network, transceiver 304 interprets the communication in view of the network protocol and transfers the enclosed information to processor 302.

Though shown as part of the media server in FIG. 3A, in some embodiments, transceiver 304 may be implemented as a separate unit coupled to the media server by, for example, a serial interface. Some embodiments may also implement a separate bridge device that acts as an intermediate communication node between wired and wireless portions of the network and or between portions of the network that use different communication protocols.

IV. Embodiment of Output Device

Figure 3B:
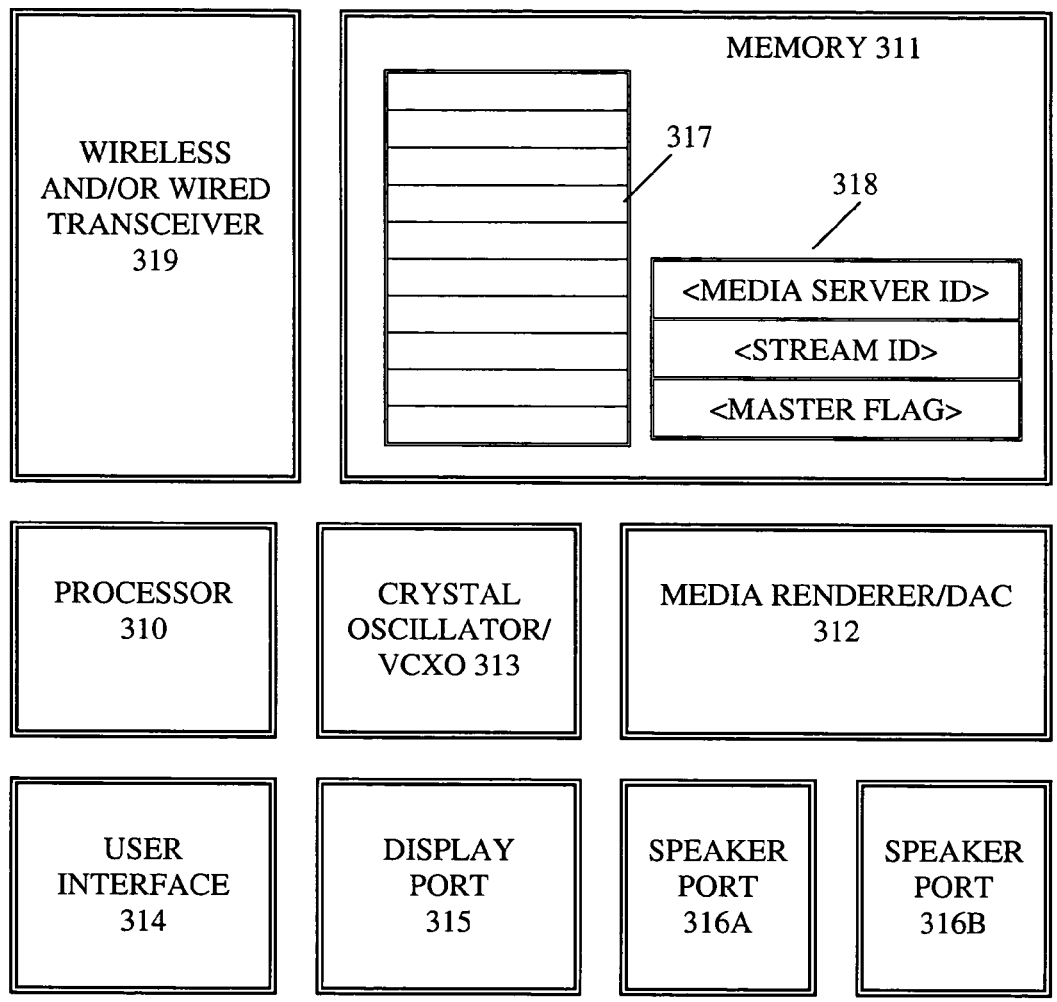
FIG. 3B is a block diagram of a media player output device in accordance with one or more embodiments of the invention.

FIG. 3B is a block diagram of an output device in accordance with one or more embodiments of the invention. As shown, the output device may include processor 310, memory 311, media renderer/digital-to-analog converter (DAC) 312, crystal oscillator 313, user interface 314, display port 315, speaker port(s) 316A and 316B, and wireless and/or wired transceiver 319.

Processor 310 may be any type of microprocessor or combination of processors, and may include specialized processing circuits such as digital signal processors (DSPs) and graphics processing units (GPUs). In one or more embodiments, processor 310 executes software or firmware instructions to receive and play back streaming media data, including implementing the methods described in this specification.

As with the media server of FIG. 3A, the output device may include software and/or hardware for converting media of one data type into another data type more conducive to playback by the media rendering hardware or software 312. Such conversion may include, for example, conversion between different digital formats (e.g., WAV to MP3), separation of audio and video channels from composite data, conversion of audio data into surround sound or other spatial audio representations, resampling of data, and filtering or equalization of data.

Memory 311 may include volatile and non-volatile memory, random access (RAM) and read-only memory (ROM). Memory 311 may be used to store software and/or firmware used by processor 310 to implement media output functions, including the output device-specific methods described in this specification. Memory 311 also stores the incoming media stream, playback parameters and output device settings. In the example illustrated in FIG. 3B, memory 311 includes playback buffer 317 and playback settings 318. Playback settings 318 may include, for example, the media server identifier for the current incoming media stream, the stream identifier for the current stream, and a flag to indicate whether the output device is in master or slave mode for purposes of processing the current stream. Memory 311 may also contain user preferences and playback settings, such as the upper and lower buffer fill thresholds for buffer monitoring in slave mode, and the nominal buffer fill level below which the output device requests more data when in master mode.

Processor 310 writes incoming stream data into buffer 317 for queued playback. The data is read from buffer 317 by media renderer/DAC 312 at a playback rate synchronized with crystal oscillator 313 (the output device's primary clock source). Media renderer/DAC 312 processes the streamed data into a form suited to driving one or more speakers via speaker ports 316A and 316B, and/or one or more video displays via display port 315. Analog or digital displays and analog or digital audio outputs may be supported. In the simplest case, the output device merely converts the streamed digital data into an analog signal. However, the output device may also be configured to perform more complex rendering operations on the digital media data without departing from the scope of the invention.

Crystal oscillator 313 may be a simple crystal oscillator (XO) with a fixed frequency, or a more complex voltage-controlled crystal oscillator (VCXO) that allows for the output frequency to be controlled to some extent by a control voltage signal. Depending upon the control capabilities of the local oscillator, processor 310 may be configured to adjust the playback rate directly by adjusting the oscillator frequency through a control voltage or programmable control value, or indirectly by expanding or reducing the data in buffer 317 (e.g., by duplicating samples or dropping samples, respectively). Embodiments of the invention that use a controllable crystal oscillator to adjust playback rate may operate without affecting the fidelity of the playback.

In one or more embodiments, the output device may provide no direct user interface, requiring that all user functions be accessed through the media server. In other embodiments, the output device may be equipped with a limited user interface providing, for example, a simple display of what is currently playing. The output device may also be configured with a more functional user interface 314 through which a user may remotely control certain functions of the media server and/or adjust settings for the respective output device, such as volume, balance, etc.

V. Embodiment of Master/Slave Negotiation Process

Figure 4:
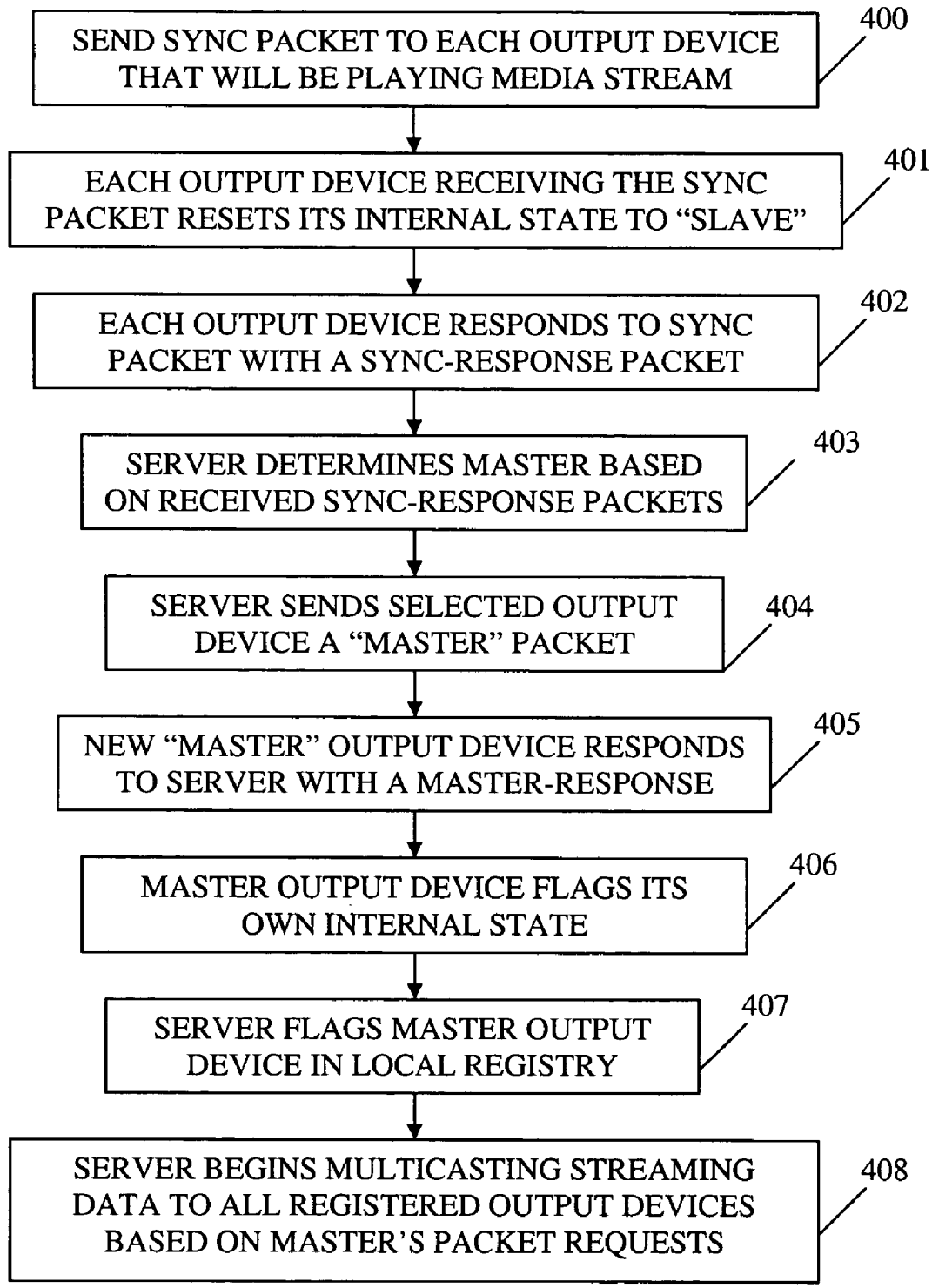
FIG. 4 is a flow diagram of a master/slave negotiation process in accordance with one or more embodiments of the invention.

FIG. 4 is a flow diagram of one possible negotiation process by which a media server and multiple output devices may determine which output device is master and which output devices are slaves with respect to playback synchronization, in accordance with one or more embodiments of the invention. It will be understood that other negotiation processes may be implemented without departing from the scope of the invention.

In block 400 of FIG. 4, when a new stream is to be played, the media server sends a "synchronization" packet to each output device that will be playing the stream.

Upon receipt of the "synchronization" packet, in block 401, all output devices reset their internal master flag to indicate that they are in slave mode. As represented by block 402, in response to the "synchronization packet", each output device immediately transmits a "synchronization response" packet to the media server.

In block 403, the media server determines which output device will be the master based on the first "synchronization response" packet received. The media server may discard any subsequently received "synchronization response" packets. In other embodiments, the media server may select the "master" device based on collected output device statistics regarding previous network behavior, such as retry rate. In block 404, the media server sends a "master" packet to the selected output device to instruct that device to switch modes.

In block 405, the output device that receives the "master" packet acknowledges receipt by sending a "master response" packet to the media server. The output device sets its internal master flag bit in block 406 to indicate that it is in master mode.

In block 407, the media server flags the entry in the local registry or device list that corresponds to the selected master output device, so that the media server may track the output device from which the media server may expect to receive authorized "data request" packets. In block 408, the media server begins sending data packets to all of the output devices selected to receive the current media stream.

As previously described in connection with the process of FIG. 2, the master/slave negotiation process may be re-initiated if the master output device fails to request further data packets within an expected timeout interval (indicating a possible failure or shutdown of the master device). Given an appropriately set nominal buffer fill level, renegotiation of a new master output device may be accomplished without playback interruption in the remaining output devices.

VI. Example Embodiments of Synchronization Process

Figure 5:
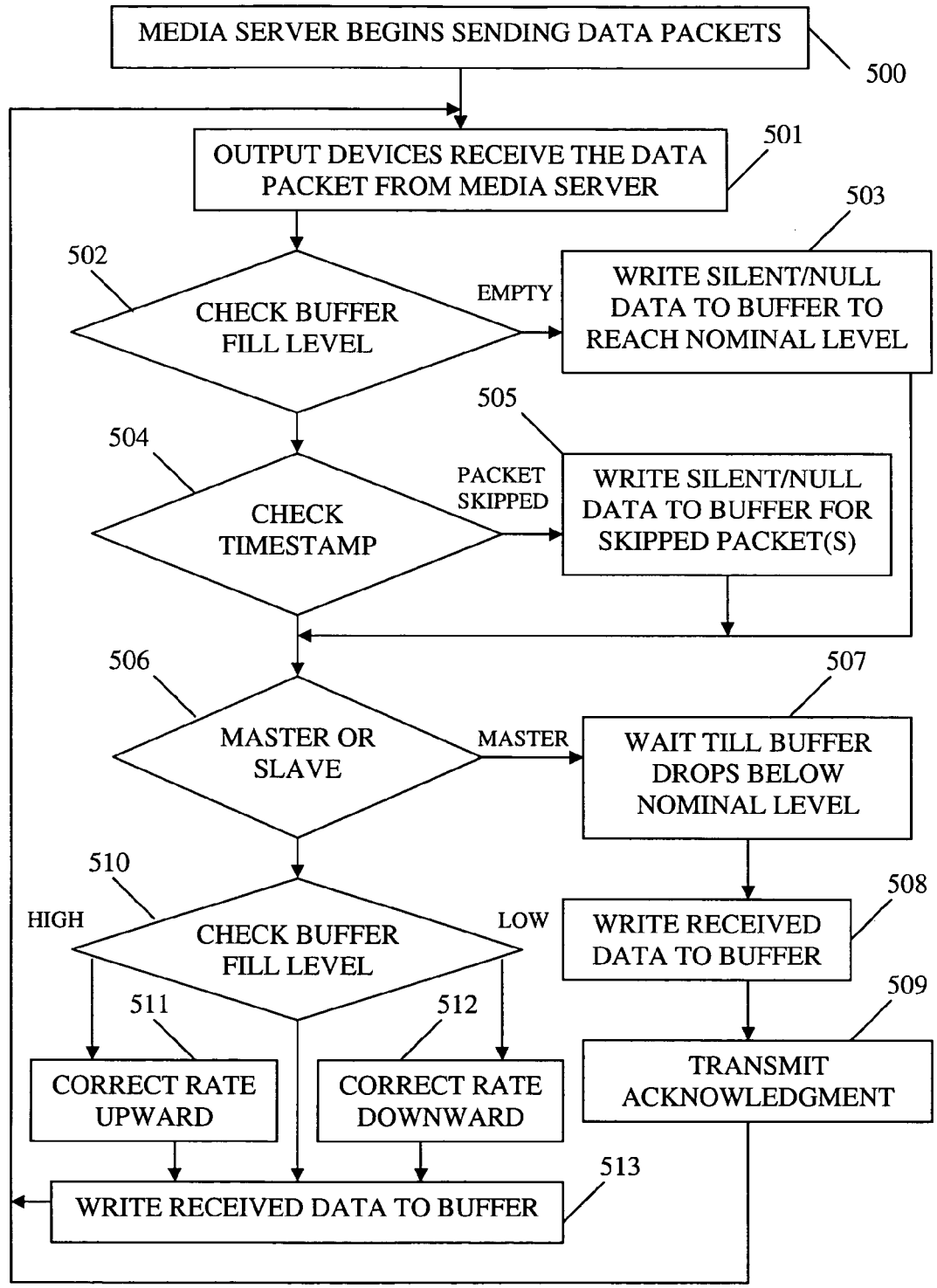
FIG. 5 is a flow diagram of an initial synchronization process for a fast network, in accordance with one or more embodiments of the invention.

FIG. 5 is a flow diagram of a synchronization process for a fast network (i.e., a network with relatively low latency for the transmission of packets between the media server and the output devices), in accordance with one or more embodiments of the invention. As described, this process may be implemented when the media server begins sending data packets to the output devices (e.g., after block 408 of FIG. 4).

In block 500 of FIG. 5, the media server begins sending data packets to the selected group of output devices using, for example, the Real-time Transport Protocol (RTP).

In block 501, the output devices receive the data packet from the media server. On receipt of a data packet, in block 502, each output device checks the fill level of its internal receive buffer. If, in block 502, the buffer is empty (i.e., it is a new stream), then in block 503 the output device writes an amount of silent or null data equal to the nominal buffer fill level to the device buffer. If the buffer is not empty in block 502, then, in block 504, the output device checks a timestamp and/or sequence number included in the data packet. The timestamp refers to the time when the attached data should begin playing back (i.e., reach the end of the buffer). If any packets have been skipped, then in block 505, the output device writes a corresponding amount of silent or null data to the buffer, or optionally requests a retry from the media server.

In block 506, if the output device is flagged as the "master", then in block 507, the output device may wait for the buffer fill level to drop below the nominal value before writing the received data to the buffer in block 508. In block 509, the master output device transmits an acknowledgement packet to the media server. As described previously with respect to FIG. 2, if the media server does not receive the acknowledgement before a pre-determined timeout, the master/slave negotiation process may be repeated. Master/slave negotiation may also be repeated if a data acknowledgement packet is received from an output device that is not the master.

If, in block 506, the output device is flagged as a "slave" rather than a "master", then in block 510, the output device checks the fill level of the buffer. If the buffer fill level is higher than a pre-determined upper threshold value, the output device provides an upward correction of the playback rate in block 511. If the buffer level is below a pre-determined value, the output device provides a downward correction of the playback rate in block 512. The slave output device writes the received data to the buffer in block 513.

Figure 6:
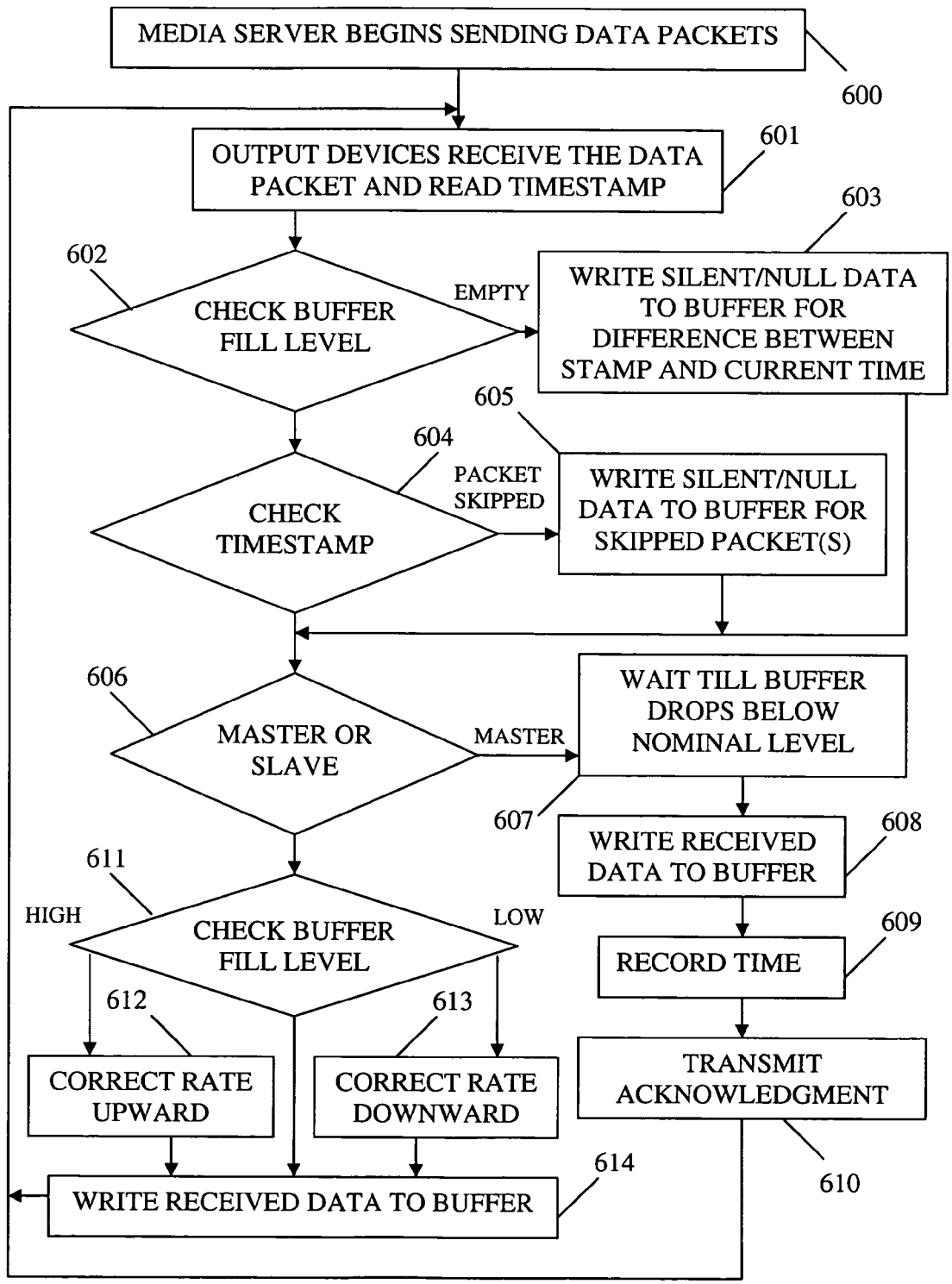
FIG. 6 is a flow diagram of an initial synchronization process for a slow network, in accordance with one or more embodiments of the invention.

FIG. 6 is a flow diagram of an initial synchronization process for slower networks, in accordance with one or more embodiments of the invention. For example, where the difference in arrival time between packets sent at nearly the same time by the media server (or multicast to multiple output devices at the same time) can exceed 20 or 30 milliseconds, an alternate embodiment of the synchronization process may be used. The embodiment described below reduces the effects of network latency on playback synchronization by using playback scheduling timestamps calculated from the buffer fill level timing of the master device.

The process of FIG. 6 employs synchronization of the system clocks between the server and all output devices. This synchronization is achieved using the Network Time Protocol (NTP), or a similar time synchronization scheme independent of the audio streaming methods described herein.

In step 600, the media server begins sending data packets to the output devices using, for example, the Real-time Transport Protocol (RTP) or a variant thereof. A timestamp in the first packet is set to a value in the near future (e.g., one or two seconds).

On receipt of a data packet, in block 601, each output device reads the timestamp of the data packet. If, in block 602, the output device's playback buffer is empty (i.e., new stream), then in block 603, the output device writes to the buffer an amount of silent or null data corresponding to the difference between the current system time and the time that the data should be played (the timestamp). If the buffer is not empty in block 602, then, in block 604, the output device determines, based on the timestamp of the packet, whether any packets have been skipped. If packets have been skipped, the output device writes a corresponding amount of silent or null data to the buffer in block 605 (or optionally requests a retry).

The process branches at block 606 based on whether the output device is flagged as the master or a slave. If the output device is the master, then (as in the process of FIG. 5) the output device waits until the buffer fill level drops below the nominal value in block 607, and writes the received data to the buffer in block 608. In block 609, the output device records the precise system time that the buffer reached the nominal value. This recorded time is transmitted to the media server in block 610 as part of the acknowledgment packet.

If, in block 606, the output device is flagged as a "slave" rather than a "master", then in block 611, the output device checks the fill level of the buffer. If the buffer fill level is higher than a predetermined upper threshold value, the output device provides an upward correction of the playback rate in block 612. If the buffer level is below a pre-determined value, the output device provides a downward correction of the playback rate in block 613.

In block 614, the media server sends the next data packet, using the timestamp returned in the previous data acknowledgment from the master to calculate the timestamp for the next packet.

Though the process embodiments described above refer to rate adjustment checks occurring with every received data packet, it will be understood that the frequency of rate adjustment checks may be reduced in other embodiments (e.g., every tenth packet received) without departing from the scope of the invention.

Further, the comparison of fill level values with upper and lower thresholds may alternatively be implemented remote to the output devices. For example, slave output devices may send buffer fill level values to the media server at predetermined intervals or in response to fill level request messages from the media server. The media server may then compare the buffer fill levels of the output devices against upper and lower threshold values, or against each other, to determine where playback rate correction is appropriate. The media server would then send upward or downward rate correction messages to those output devices that are lagging or leading by an undesired amount.

VII. Embodiments of Control Loop for Playback Rate

For output devices that include a controllable primary clock source such as a voltage-controlled crystal oscillator (VCXO), correction of the playback rate may be implemented directly by incrementing or decrementing the frequency value of the VCXO to speed up or slow down the playback process. For output devices that do not have controllable primary clock sources, an alternate mechanism may be used to adjust the playback rate. One such alternate mechanism for adjusting the playback rate may include dropping data samples from the buffer or from the received data prior to its being written to the buffer to increase the playback rate, and duplicating or adding data samples to the buffer or to the received data prior to its being written to the buffer, to decrease the playback rate. Where data is modified to adjust the playback rate, signal processing techniques (e.g., filtering and interpolation) may be applied to reduce any impact on the fidelity of the media signal. For most applications, the incremental data modifications needed to correct for normal ranges of clock frequency drift will be of an order too small to be detected by human senses (e.g., one in one thousand samples).

Figure 7:
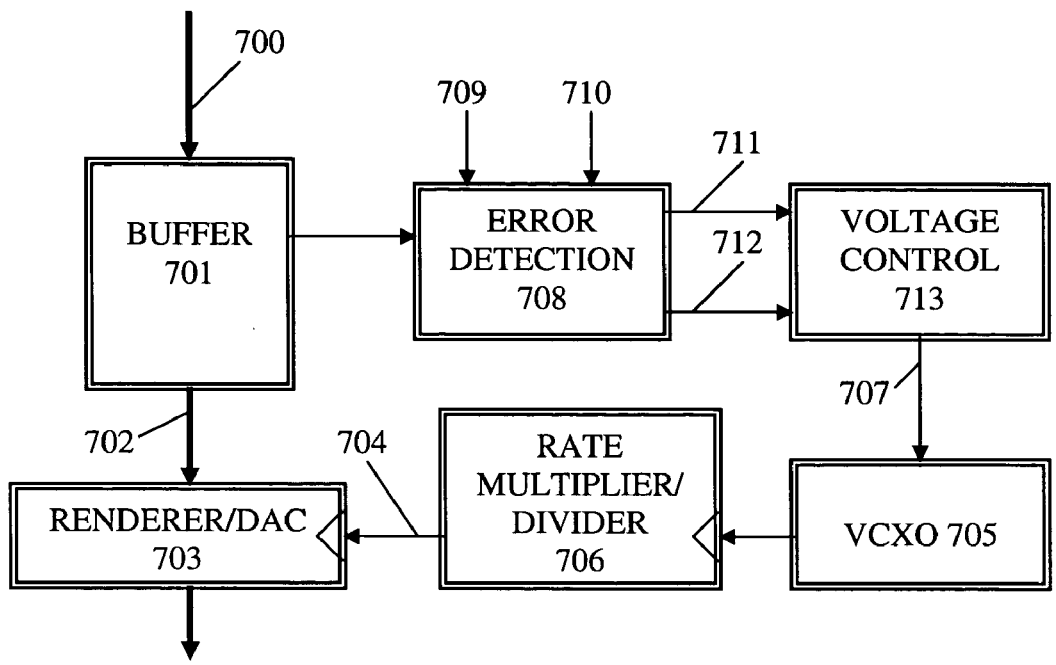
FIG. 7 is a block diagram of a control system for monitoring and adjusting playback rate in a slave output device by altering a VCXO frequency, in accordance with one or more embodiments of the invention.

FIG. 7 is a block diagram of a playback rate control loop applying direct control of a crystal oscillator frequency, in accordance with one or more embodiments of the invention. Input 700 represents media data that has been extracted from incoming packets to be written to buffer 701. Data samples 702 are consumed from buffer 701 by renderer/DAC 703 according to the playback clock 704 operating at the playback rate, Rp. Playback clock 704 is in turn derived from VCXO 705 by rate multiplier/divider block 706. VCXO (voltage-controlled crystal oscillator) 705 acts as the primary clock source.

VCXO 705 is configured with a voltage control input 707. Playback rate control is provided by error detection block 708, which monitors a fill level of buffer 701 and compares that fill level with upper threshold value 709 and lower threshold value 710 to generate an upward rate correction signal 711 or a downward rate correction signal 712 (or no correction if the fill level lies within the upper and lower threshold values as desired). Voltage control block 713 receives correction signals 711 and 712, and provides a voltage control signal to voltage control input 707 of VCXO 705. Voltage control block 713 may provide an integration function to correction input 711 and 712 to smooth rate adjustments over time. In one or more embodiments, the device processor provides the voltage control signal as a one-bit pulse-width modulated (PWM) output.

Figure 8:
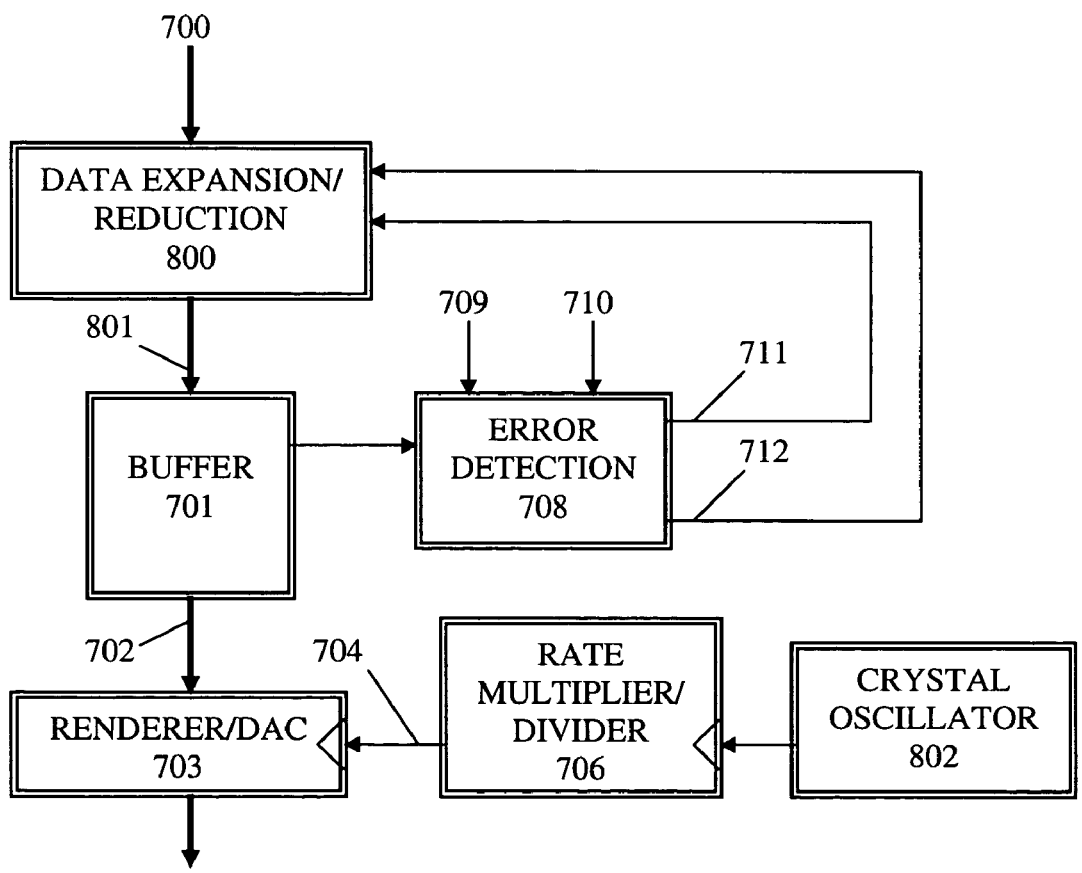
FIG. 8 is a block diagram of a control system for monitoring and adjusting playback rate in a slave output device by altering the media data in the buffer, in accordance with one or more embodiments of the invention.

FIG. 8 is a block diagram of a playback rate control loop utilizing expansion and reduction of buffered data, in accordance with one or more embodiments of the invention. Input 700 represents media data that has been extracted from incoming packets to be written to buffer 701. Unlike the embodiment of FIG. 7, input 700 is provided to data expansion/reduction block 800. Adjusted data 801 is then provided to buffer 701. Data samples 702 are consumed from buffer 701 by renderer/DAC 703 according to the playback clock 704 operating at the playback rate, Rp. Playback clock 704 is in turn derived from crystal oscillator 802 by rate multiplier/divider block 706. Crystal oscillator 802 acts as the primary clock source.

Playback rate control is provided by error detection block 708, which monitors a fill level of buffer 701 and compares that fill level with upper threshold value 709 and lower threshold value 710 to generate an upward rate correction signal 711 or a downward rate correction signal 712 (or no correction if the fill level lies within the upper and lower threshold values as desired). Data expansion/reduction block 800 receives upward rate correction signal 711 and downward rate correction signal 712 to adjust the number of samples output via adjusted data 801 to buffer 701. When the upward rate correction signal 711 is applied, data expansion/reduction block 800 removes one or more samples from data 700. When the downward rate correction signal 712 is applied, data expansion/reduction block 800 adds one or more samples to data 700, e.g., by duplication of existing samples or interpolation to generate new samples. The playback rate, Rp, of renderer/DAC 703 remains unchanged, but the average throughput of the media stream approximates that of the master device.

Thus, a method and apparatus for synchronizing streaming media with multiple output devices have been described. Particular embodiments described herein are illustrative only and should not limit the present invention thereby. The invention is defined by the claims and their full scope of equivalents.

The invention claimed is:

1. A media server comprising:
a transceiver coupled to a network;
a streaming media source coupled to said transceiver;
a processor;
a memory coupled to said processor, said memory comprising:
   a list of output devices coupled to said media server via said network;
computer code comprising instructions for causing said processor to perform the steps of:
   transmitting a synchronization packet to said output devices;
   awaiting responses to said synchronization packet from said output devices;
   determining one of said output devices to be a master output device based on said responses to said synchronization packet received from said output devices;
said master device sending a plurality of successive requests for successive sets of streaming media data of a media stream to said media server when a fill level of a buffer of said master device falls below a desired level;
in at least one of said plurality of output devices other than said master device, determining that a fill level of a playback buffer of said output device is outside of a desired level range, and applying a playback rate adjustment to match a rate of reception of said successive sets of streaming media data when said fill level is outside said desired level range;
identifying a first request received from said master output device via said network for a first set of streaming media data of a first media stream;
transmitting said first set of streaming media data to said output devices via said network in response to said first request received from said master output device;
awaiting a second request from said master output device for a second set of streaming media data of said first media stream;
transmitting said second set of streaming media data to said output devices via said network in response to said second request received from said master output device.

2. The media server of claim 1, wherein said memory comprises:
a plurality of device identifiers corresponding to a plurality of said output devices;
an association between said plurality of device identifiers and said first media stream.

3. The media server of claim 1, wherein said computer code comprises instructions for causing said processor to perform the step of:

transmitting a master packet to said master device.

4. The media server of claim 1, wherein said computer code comprises instructions for causing said processor to perform the step of:

designating a different one of said output devices as a master device when a time interval between said first and second requests exceeds a timeout interval.

5. The media server of claim 1, wherein said second set of streaming media data comprises data packets, said data packets comprising a timestamp data packet indicating a playback time.

6. The media server of claim 5, wherein said second request for a second set of streaming media data comprises a time.

7. The media server of claim 1 further comprising a user interface comprising a user activatable control for associating one or more of said output devices with said first media stream.

8. The media server of claim 7, wherein said memory comprises output device association data indicating said association of said one or more of said output devices with said first media stream.

9. The media server of claim 1, wherein said memory comprises media data file association data indicating an association of a media data file with said first media stream.

* * * * *